(12) United States Patent
Rangarajan et al.

(10) Patent No.: US 6,510,439 B1
(45) Date of Patent: Jan. 21, 2003

(54) METHOD AND SYSTEM FOR CONSISTENT UPDATE AND RETRIEVAL OF DOCUMENT IN A WWW SERVER

(75) Inventors: Sampath Rangarajan, Bridgewater, NJ (US); Shalini Yajnik, Scotch Plains, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/370,340

(22) Filed: Aug. 6, 1999

(51) Int. Cl.[7] .............................................. G06F 17/30

(52) U.S. Cl. ...................... 707/201; 707/10; 707/104.1; 709/203; 709/217

(58) Field of Search ........................ 707/9–10, 200–203, 707/100–104.1; 709/224, 217, 250; 705/34, 40, 79

(56) References Cited

U.S. PATENT DOCUMENTS

| | | | | |
|---|---|---|---|---|
| 5,774,670 A | * | 6/1998 | Montulli | 345/835 |
| 5,848,396 A | * | 12/1998 | Gerace | 705/10 |
| 5,864,871 A | * | 1/1999 | Kitain et al. | 707/104 |
| 6,088,718 A | * | 7/2000 | Altschuler et al. | 709/203 |

OTHER PUBLICATIONS

S. Rangarajan, S. Yajnik, P. Jalote, WCP–a tool for consistent on–line update of documents in WWW server, 1998, Elsevier Science B.V., pp. 327–336.*

* cited by examiner

Primary Examiner—John E. Breene
Assistant Examiner—Mohammed Ali
(74) Attorney, Agent, or Firm—Darby & Darby

(57) ABSTRACT

A system for providing coherent access to different versions of a group of documents stored in a file system and retrievable over the Internet from an HTTP server includes a state management server which stores registration data indicating the file paths of the documents in each version of the group and a set of index paths used by clients to reference documents in the group. State information identifying the version of said group previously accessed by a client is stored in a cookie which is associated with the domain of the state management server and the path of the group. A client requests a document from the group by issuing a request to an HTTP server including the index path of the desired document. The request and associated cookie, which is automatically transmitted by the client Internet software, is forwarded to the state management server. The state information stored in the cookie is extracted and used to determine which version of the group of documents should be accessed. The index path is then mapped to the file path for the appropriate version of the requested document and the data information is updated to reflect the present access. The mapped file path and cookie are then returned to the HTTP server.

12 Claims, 5 Drawing Sheets

FIG. 2

| GID | GROUP PATH | GVN | INDEX PATHS | FILE PATHS | TO |
|---|---|---|---|---|---|
| john_thesis 30a | /usr/httpd/docs/john 32a | Index | /home.html /thesis/toc.html /thesis/ch1.html /thesis/ch2.html | 34a | |
| | | 1 | | /home.html /thesis/v1/toc.html /thesis/v1/ch1.html /thesis/v1/ch2.html | 10 |
| jane_resume 30b | /usr/httpd/docs/jane | Index | /resume.html /pub.html | | |
| | | 1 | | /v1/resume.html /v1/pub.html | 15 |

FIG. 3

| GID | GROUP PATH | GVN | INDEX PATHS | FILE PATHS | TO |
|---|---|---|---|---|---|
| john_thesis | /usr/httpd/docs/john | Index | /home.html<br>/thesis/toc.html<br>/thesis/ch1.html<br>/thesis/ch2.html<br>/thesis/ch3.html | | |
| | | 1 | | /home.html<br>/thesis/v1/toc.html<br>/thesis/v1/ch1.html<br>/thesis/v1/ch2.html | 10 |
| | | 2 | | /home.html<br>/thesis/v2/toc.html<br>/thesis/v2/ch1.html<br>/thesis/v2/ch2.html<br>/thesis/v2/ch3.html | 10 |
| jane_resume | /usr/httpd/docs/jane | Index | /resume.html<br>/pub.html | | |
| | | 1 | | /v1/resume.html<br>/v1/pub.html | 15 |

FIG. 4

| GID | GROUP PATH | GVN | INDEX PATHS | FILE PATHS | TO |
|---|---|---|---|---|---|
| john_thesis<br>_30a_ | /usr/httpd/docs/john | Index | /home.html<br>/thesis/toc.html<br>/thesis/ch1.html<br>/thesis/ch2.html<br>/thesis/ch3.html | | |
| | | 1 | | /home.html<br>/thesis/v1/toc.html<br>/thesis/v1/ch1.html<br>/thesis/v1/ch2.html | 10 |
| | | 2 | | /home.html<br>/thesis/v2/toc.html<br>/thesis/v2/ch1.html<br>/thesis/v2/ch2.html<br>/thesis/v2/ch3.html | 10 |
| | | 3 | | /home.html<br><deleted><br>/thesis/v3/ch1.html<br>/thesis/v3/ch2.html<br>/thesis/v3/ch3.html | 10 |
| jane_resume | /usr/httpd/docs/jane | Index | /resume.html<br>/pub.html | | |
| | | 1 | | /v1/resume.html<br>/v1/pub.html | 15 |

METHOD AND SYSTEM FOR CONSISTENT UPDATE AND RETRIEVAL OF DOCUMENT IN A WWW SERVER

TECHNICAL FIELD

This invention is related to a method and system for providing coherency between files in a group of files retrieved over an Internet connection.

BACKGROUND OF THE INVENTION

In the last few years, there has been an exponential growth in the number of users accessing and the number of users providing information over the Internet. In a typical example, an information provider generates or supports a set of information files and places these files on an Internet HTTP server. A Universal Resource Locator ("URL") identifies the physical location of the document, i.e., the server on which it resides and its path and file name. Read-only access to Internet documents is provided to a client via the HTTP protocol.

To keep the HTTP protocol simple and lightweight, it has been designed to be stateless. However, recent work in the standards committee has introduced a state management mechanism based on "cookies." Cookies are small data structures used by a web server to deliver state data to a web client user and request that the client store the information. The HTTP server supplying the cookie also adds the information about the domain and the subset of URLs for which the cookie is applicable. The client stores cookie data in one or more flat files on its local hard drive. When a client makes a request to an HTTP server for document in the set and domain identified by a cookie, then, along with the request, the client software also sends back the cookie. In this manner, web sites can "remember" information from one request to the next and simulate a continuous connection to that site. Cookies are conventionally used to record user-preferences, passwords, and the like, so that such information need not be entered by the user every time.

At many Internet web-sites, there are sets of documents which are updated on an ongoing basis. Often, the documents are part of a set of logically related documents, i.e., a "document group". Such groupings are defined by the information provider. Independent updates and accesses of such related documents can cause clients to receive inconsistent information, especially if they are accessing the documents while the update process is in progress. The problem of consistency arises when a group of related documents, such as chapters in a book with each chapter represented as a link in the Table of Contents page, are updated individually. If no preventative measures are taken, a client accessing the group may receive some files which are old and some which are new, resulting in an inconsistency in the information provided to the clients.

Various approaches have been taken to address this problem. In the first approach, no control over updates is exerted and the information provider accepts that some clients may get inconsistent information. In a second approach, the service is made unavailable for the period of time when the update is being done.

These approaches are acceptable in most informal situations where the updates are very infrequent and where clients will accept breaks in service during updates. However for some applications, it is essential that consistency of data seen by the client be maintained without disrupting the service. Thus, there is a need to perform on-line updates of documents such that the update guarantees consistency of data as seen by the client during a given logical session.

One newly developed technique relies on the notion of group consistency within a persistent HTTP connection. Under this consistency model, when a client accesses a group of interrelated documents within a single persistent HTTP connection, it receives a consistent version of all documents in the group, even if some of the documents are updated during the access interval. Access to the correct version of a file is provided by selectively updating and reloading the file server's request Redirect data table. This technique is discussed in more detail in S. Rangarajan, S. Yajnik, and P. Jalote, "WCP—A tool for consistent on-line update of documents in a WWW server", Proceedings of the Conference on the World-Wide Web (WWW7), April 1998, Brisbane, Australia.

Although an adequate solution in some situations, this technique is restrictive in practice because even if a server is made aware of which documents are logically related, it cannot prohibit a client from opening a new persistent HTTP connection to retrieve some documents that belong to a group already being accessed through another active persistent connection and it cannot control when a persistent HTTP connection is closed by the client. For example, a client may access some documents that belong to a logical group, close the connection and open a new connection to retrieve the remaining documents in the group. Further, the information provider is limited to the single definition of a logical session.

Accordingly, it would be advantageous to provide a system and method for consistent update and retrieval of documents from an Internet server which supports a flexible definition of a logical session and which is not limited to consistent access only during a single persistent HTTP connection.

SUMMARY OF THE INVENTION

An HTTP cookie-based State Management Server ("SMS") is used to provide for consistent update and retrieval of documents from groups of related documents available through an Internet web server. Each group of documents contains one or more files which are maintained by an information provider. Types of file groups include components of a software package available for download, chapters in a book, etc. Each group has a set of index paths, which are referenced by users seeking access to files in the group. The index paths for a group are mapped to the physical locations of the files which form the various versions of the group. The index paths and the file paths for various versions of a group are maintained in a registration table.

Whenever a group is to be created or a new version of a group is to be added to an Internet server, the information provider updates the registration table to indicates the various versions of a group and the names and locations of the files which are members of each version of the group. This is preferably done by way of a Group Specification User Interface ("GSUI") program. The SMS is configured to retain a copy of the current registration table in memory, i.e., by reading the registration table in response to an interrupt from the GSUI indicating that the table has been updated.

Client access to the system is provided through a conventional HTTP server which invokes a program, such as a Common Gateway Interface ("CGI") script, that interacts with the SMS. A client requests a file by accessing an HTTP server and identifying the desired document by a URL containing the document's index path. According to one aspect of the invention, the requested URL does not reference a file in the group directly, but instead references the file by its index path. If the client has previously accessed a document in the group, a cookie generated by the SMS and which is associated with the referenced URL and contains state information related to the prior access will have been provided to the client and locally stored. Through the normal operations of the client software, this cookie will also be provided to the server.

Upon receiving a client request, the HTTP server calls the CGI program and passes as parameters the URL of the requested document and the accompanying cookie, if provided by the client. The CGI program establishes a connection with the SMS if one has not been established, by mechanisms such as a socket connection or region of shared memory, and forwards the path of the requested URL and the cookie that it received from the HTTP server. In response, SMS examines the Registration Table and the data contained in the cookie to determine the proper group of documents to be mapped to the received file request. The path identifying the location of the correct document is then returned to the CGI program. The SMS also returns a modified cookie which contains state information reflecting the present access and group version for the existing logical session. If no cookie was provided, the SMS defaults to mapping the request to the most recent version of the group and generates and returns a new state cookie reflecting this access. The CGI program in turn prepares a partial header with the updated cookie information and sends this header, along with the mapped path of the document which is to be returned to the client, back to the HTTP server. The server then completes the header for the reply, includes the mapped document, and sends the reply, with the document and updated or new cookie, to the client.

BRIEF DESCRIPTION OF THE DRAWINGS

The foregoing and other features of the present invention will be more readily apparent from the following detailed description and drawings of illustrative embodiments of the invention in which:

FIG. 2–4 are sample document registration tables; and

DETAILED DESCRIPTION OF THE PREFERRED EMBODIMENTS

The present invention is directed to a system and method for providing consistent access to a group of documents during a logical session. For purposes of the following discussion, a client is said to have consistent access to a group G of documents during a logical session when the client gets all documents of version v of a group, irrespective of the fact that the document group has undergone a version change to new version v' (i.e., as a result of an update to one or more of the documents in the group) during the client's access interval.

A logical session between client c and version v of a group of documents G begins when the client first retrieves any document from version v of Group G. There are several possible endpoints for a logical session and one or more can be selected according to user preferences. In general, endpoints for a logical session are based on one or a combination of the following events: (1) end of the physical session opened between the client and the server, e.g. the termination of a persistent connection; (2) the expiration of a predefined timeout period running from the beginning of the logical session; (3) the time interval since the last access to version v of the group exceeds a given timeout interval; (4) a client requests a version v document which it has already accessed once since the beginning of the logical session; and (5) a client has accessed all documents in version v of the group.

Once a client receives a new version v' of the group, any clients starting up new logical sessions with the group after this access receive v' or newer versions of the group. Note that a version change for a document group G from v to v' only means that at least one of the documents in G has undergone a version change. It is not required that all documents in G undergo a change to create v'0 from v.

Figure 1:
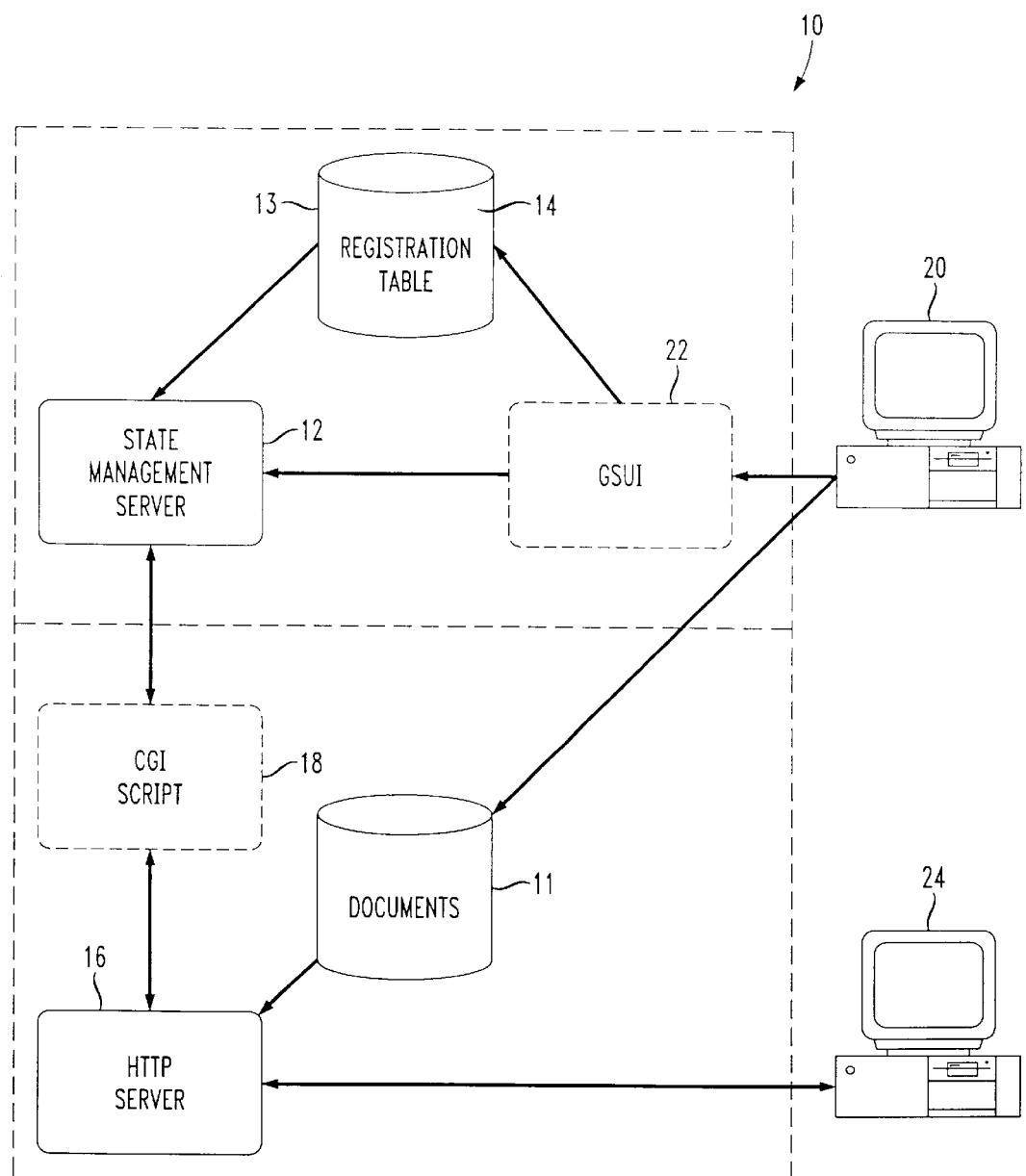
FIG. 1 is a diagram of the structure and flow of a system for consistent update and retrieval of documents according to the invention.

FIG. 1 is a block diagram illustrating the structure and flow of a system 10 for consistent update and retrieval of documents over the Internet. The system comprises a State Management Server ("SMS") 12 which contains a computer processor and RAM, and which is connected to a data store 13 containing a Registration Table 14, described below. The State Management Server 12 is connected to an HTTP server 16. The connection is managed by a Common Gateway Interface ("CGI") program or script 18. Groups of logically related documents are maintained on one or more storage disks 11 accessible to the HTTP server 16 and thereby to an end-user 24.

The registration table 14 contains information regarding the versions of the document groups and the names and locations of the files on the disk 11 which are members of each version of the group. The registration file also contains a mapping of a reference or index path, by which an end user references a document in the group, to the physical locations of the corresponding documents in each version of the group. When the documents on disk 11 are updated (i.e., by information provider 20), the registration table 14 is also updated, preferably via a Group Specification User Interface ("GSUI") program 22.

As discussed further below, when a client requests a document through the HTTP server 16, the client identifies the document by its index path. When a request is received, it is passed to the SMS 12, i.e., by the CGI script 18. The SMS 12 examines the registration table 14 and state information provided by the client and determines the correct version of the document to return. The path identifying the physical location of this document is then returned to the HTTP server 16 so that the document can be retrieved.

A representative Registration Table 14 is illustrated in FIG. 2. Each group of documents described in the Registration Table 14 is assigned a unique Group ID ("GID") 30. Each GID 30 also has an index path set 34 and one or more file path sets 36 associated with it. The index path set 34 associated with each group contains a list of one or more paths for documents in the group as the paths are to be seen and referenced by a client 20 seeking to access the documents, for example, as part of a URL provided by the client to the HTTP server.

The file path sets 36 contain the actual paths where the documents in the respective versions of the group are located. Each file path in a file path set 36 corresponds to an entry in the associated index path set 34. Preferably, the correspondence between index paths and associated file paths are indicated by the order the paths appear in each of the sets. A group path 32 can also be provided to serve as a prefix for the index and file paths 34, 36. In the registration table illustrated in FIG. 2, a group version number ("GVN") 38 is used to identify which record for a group contains the index and to identify the group version number ("GVN") for each of the sets of file paths 36 which are associated with the group. As illustrated in this embodiment, the "Index" GVN entry is separate from the specific version data entries and therefore there is no specific file path data for the Index entry.

In the example illustrated in FIG. 2, two groups 30 are defined: "john_thesis" 30a and "jane_resume" 30b, each of which has a single version. The index path set 34a for the first group 30a identifies four reference paths. The file path set 36a contains four corresponding file paths which identify the physical location of the files in version 1 of the group 30a. A group path of prefix 32a is also provided. Thus, with reference to group 30a, the index paths and corresponding physical locations of the files in version one of group 30a are:

| INDEX PATH | FILE PATH |
| --- | --- |
| /usr/httpd/docs/john/home.html | /usr/httpd/docs/john/home.html |
| /usr/httpd/docs/john/thesis/toc.html | /usr/httpd/docs/john/thesis/v1/toc.html |
| /usr/httpd/docs/john/thesis/ch1.html | /usr/httpd/docs/john/thesis/v1/ch1.html |
| /usr/httpd/docs/john/thesis/ch2.html | /usr/httpd/docs/john/thesis/v1/ch2.html |

When a new version of the group is created, i.e., in response to revising one or more of the documents in the group, the new version is recorded in the registration table. With reference to FIG. 3, the registration table 14 has been updated to identify a version 2 of the john_thesis group 30a. The record containing the file path set 36b for version 2 is identified by its group version number (2). This version contains 5 documents. Because an additional document has been added to version 2 of the group, as indicated by file path 40 in file path set 36b, the index path set is also updated to include a path reference 42 to the new file. The index paths and corresponding physical locations of the files in version two of group 30a are therefore:

| INDEX PATH | FILE PATH |
| --- | --- |
| /usr/httpd/docs/john/home.html | /usr/httpd/docs/john/home.html |
| /usr/httpd/docs/john/thesis/toc.html | /usr/httpd/docs/john/thesis/v2/toc.html |
| /usr/httpd/docs/john/thesis/ch1.html | /usr/httpd/docs/john/thesis/v2/ch1.html |
| /usr/httpd/docs/john/thesis/ch2.html | /usr/httpd/docs/john/thesis/v2/ch2.html |
| /usr/httpd/docs/john/thesis/ch3.html | /usr/httpd/docs/john/thesis/v2/ch3.html |

When a group is revised to delete a document, care must be taken to preserve the mapping of the paths in the index path group since the deleted document is still a part of one or more earlier versions of the group. As shown in FIG. 4, the document "toc.html" has been removed from file path set 36c representing version 3 of group 30a. Note that in this particular table embodiment, the mapping between the paths in the index path set 34a and the paths in the file path sets 36a–36c are determined by the order paths are listed. To preserve the mapping between the paths in the index path set 34a and the prior versions of the group, the deleted file path is replaced with a place holder 44. The corresponding index path 46 in index path set 34a still maps to the appropriate file paths 48, 50 in the file path sets 36a, 36b for the previous versions of the group. It should be noted that a new version does not need to add additional files. Instead, the number and designation of the files can remain the same with variations in the file contents.

When a client requests a document through the HTTP server 16, the client identifies the document by its index path and the index path is mapped to the appropriate file path version. In order to determine which is the appropriate group version to map a client request to, some memory regarding prior accesses to the group by the client must be maintained. According to an aspect of the invention, this "state" information is maintained in the form of a "cookie" which is stored on the client's computer system and which is automatically forwarded to the HTTP server 16 by the client's Internet software.

A cookie is a small data structure used by a web server to deliver state data to a web client user and request that the client store the information. The HTTP server supplying the cookie also adds the information about the domain and the subset of URLs for which the cookie is applicable. A typical cookie contains a NAME and VALUE pair which is used to define a data element and an associated value. A cookie also contains a DOMAIN field which stores data indicating the server-side domain for which the cookie is valid and a PATH field which stores data indicating the subset of URL's on the specified domain for which the cookie is valid. When a client makes a request to a server in a given domain, the client software matches the server's domain with the domain attribute in the cookie list and determine which of those matching cookies have a path attribute which is a prefix of the requested URL. All the cookies that match both domain and path attributes are sent to the server along with the URL request.

A cookie can also include an EXPIRE field which specifies the date and/or time at which the cookie will expire. After a cookie has expired, it is discarded by the client.

Through the use of the DOMAIN and PATH fields, a cookie can be configured to be valid for a specific Group Path 32 associated with a group of documents so that when a client attempts to access a document by referencing its index path, the cookie is forwarded to the HTTP server 16 along with the document request. According to the invention, the VALUE field of the cookie is used to store information indicating which version of the group was most recently accessed by the client and which documents in that group have already been accessed.

The specific operation of each of the elements illustrated in FIG. 1 and the use of cookies to store state information indicating the correct version of documents to be retrieved will now be discussed.

The HTTP server 16 is the server side front end which interacts with the clients 24. The HTTP server 16 receives a client request and parses it to extract the URL of the requested document.

HTTP servers are designed to serve documents and in most cases do not process data sent from a client, such as data in the form of a cookie. In such a situation, a gateway program is used to process the client data on the server end. In the Internet environment, the Common Gateway Interface ("CGI") is the mechanism which controls the flow of data from the HTTP server to the gateway program. According to the CGI specification, data is sent to the gateway programs through environment variables and read by the program from standard input. To return data back to the HTTP server, the gateway program writes out the data to its standard output, which is then read by the HTTP server and, after proper modifications to the data headers, returned to the client.

In the present invention, a CGI script 18 is used as an interface between the HTTP server 16 and the State Management Server 12. When a client request is received, the HTTP server 16 sets the CGI environment variables to reflect the full URL of the requested document and the cookie(s) accompanying the client's HTTP request. The CGI script 18 is then executed. The script 18 is configured to establish an Internet socket connection with the State Management Server 12 and then forward the URL and any received cookies to the SMS 12. The particular implementation of such a CGI script will be apparent to one of skill in the art and is therefore not discussed in detail herein.

The SMS 12 is configured to retain a copy of the most recent Registration Table 14 in memory and to use the data in the Registration Table to map client requests to the proper version of documents. Preferably, client updates to the Registration table are managed by a Group Specification User Interface ("GSUI") program 22. After an update to the Registration Table is made, the GSUI 22 sends an interrupt to the SMS 12 indicating that the Registration Table should be reloaded. Alternatively, the SMS 12 can load the Registration Table only on an as-needed basis. In a further embodiment, the Registration Table maintained by the GSUI 22 can be stored in memory which is shared by the SMS 12 such that the most recent version is automatically available.

When the SMS 12 receives a forwarded URL and cookie from the CGI program, it accesses the Registration Table data and determines the file path of the appropriate document for the client to receive according to the data contained in the cookie. The decision as to what version of a document should be provided to a client is made based on state information that is stored in the cookie, i.e., the last version of the group that was accessed and which document in that group has already been requested. The cookie state information is then revised to indicate the new reference and the determined file path, and a new cookie is returned to the HTTP server 16 via the CGI script 18. The HTTP server then retrieves the identified document and returns it and the modified cookie to the client 24.

In a particular embodiment of the invention, a separate cookie is used for each group of documents. The group ID of the group for which a cookie is associated with is encoded in the NAME field, i.e., NAME="john_thesis". The PATH is set to the group path of this group, i.e., PATH="/usr/httpd/docs/john". The DOMAIN field is set to equal the Internet domain address of the HTTP server 16.

In conventional Internet Browser software, cookies are implemented with only one VALUE field. Thus, to store both the group version number and the document file access history, these two informational values must be combined. In the preferred embodiment, a first portion of the VALUE field is used to store a group version number GVN and a second portion of the VALUE field is used to store information about what documents in that version have already been accessed by the client during the current logical session, i.e., in the form of a bit vector BV, where each bit corresponds to a path in the index path set 34 and the bit value indicates whether the client has accessed the corresponding file in that version or not. Alternatively, the values can be stored in separate cookies.

A logical session begins when a client makes a request for a document in a document group without an accompanying cookie. When a request is received by the SMS without a cookie, the SMS accesses the Registration table and maps the received index path to the corresponding file path in the file path set of the most recent version of the group (i.e., the one with the largest group version number). The file path is then returned to the HTTP server 16 through the CGI script 18. The SMS 12 also creates a new cookie associated with the group and which contains a VALUE field identifying the most recent group version and the index path requested. If the client request is accompanied by a cookie, the SMS recognizes it as an ongoing session, updates the state information on the cookie and returns this cookie together with the appropriate file path of the version to be returned.

A variety of techniques can be used to encode state information in a cookie. A particular implementation is now discussed through the following examples. For this example, the Value information in a cookie is limited to a 32 bit segment. If the maximum number of versions of a group that can be maintained is limited to 4, then the GVN portion of the VALUE field only needs to be 2 bits long. The remaining 30 bits comprise the bit vector BV. Each bit of BV represents a document in the group and the value of the bit specifies if a document of this particular version has previously been accessed by the client in the current logical session. If the bit is 1, then the document was previously accessed, otherwise not. In this example, given that BV is 30 bits long, a group can consist of at most 30 documents. It is apparent that for a fixed-length VALUE field, the number of documents in a group and the number of supported versions are related. However, this is not a major concern when the VALUE field is long or of unlimited length, or if more than one VALUE field is available.

For example, with reference to FIG. 3, if a client access received at HTTP server 16 for document "/usr/httpd/docs/john/thesis/toc.html" does not include an accompanying cookie from the client, the request is considered to be the start of a logical session. The SMS determines the position of the requested document in the index path set 34a and then maps this index path to the corresponding file path in the file path set 36b for the most recent version (here version 2). The SMS returns the file path "/usr/httpd/docs/john/thesis/v2/toc.html" as the file path and also creates and returns a cookie. The cookie NAME is "john/_thesis", thus associating the cookie with the referenced group. The DOMAIN field is set to the domain of the HTTP server 16 and the PATH field in the cookie is set to the Group Path, "/usr/httpd/docs/john."

To record the initial client access, the GVN portion of the VALUE field is set to 2, since version 2 is the most recent version accessed, and the BV portion of the VALUE field is set to the binary value "01000. . . ", where the first five bits indicate that after this request is served, the client will have accessed only the second document in the group of five documents in this version. Because the group only contains 5 documents, any additional bits are don't cares.

Subsequently, the client requests the document "/usr/httpd/docs/john/thesis/ch1.html" from the HTML Server 16. The prefix of this request ("/usr/httpd/docs/john") matches the PATH information in the cookie and the DOMAIN is also the same. Thus, the client will return the the cookie to the HTTP server 16 along with the document request.

When the request and cookie are forwarded to the SMS, the SMS reads the NAME field in the cookie to determine the Group ID of the group being accessed. The GVN and BV portions of the VALUE field are extracted. In this example, the GVN value indicates that a logical session has previously been established with access to version 2 of this document group. The index path in the request is mapped to the corresponding file path in the version 2 file path set 36b to identify the file path of the correct version 2 document to return, here "/usr/httpd/docs/john/thesis/v2/ch1.html". The SMS also revises the BV data field to be "01100", reflecting the fact that after the request is serviced, the second and third documents of this version will have been accessed by the client.

As a second example, another client issues a request to the HTTP server 16 for document "/usr/httpd/docs/john/thesis/ch1.html". A cookie is provided with this request having a NAME of "john_thesis" and where the GVN and BV components of the VALUE field are "1" and "1101x", respectively, where "x" is a don't care. The receipt of this cookie by the SMS indicates that the second client has already established a logical session with respect to version 1 of this group. Thus, the index path will be mapped to a file path in the file path set 36a corresponding to group version 1. Here, the returned file path is "/usr/httpd/docs/john/thesis/v1/ch1.html".

In addition, based on the cookie BV field, after this request is serviced, the second client will have accessed all documents in group 1. If this condition is defined to indicate the end of a logical session, the returned cookie is modified to indicate that a subsequent access to this group indicates the start of a new logical session. In one implementation, the BV is returned with all relevant bits set to "1", thus indicating that all documents in the version have been accessed. When the SMS receives a cookie with a BV having all document bits set to "1", it treats the situation essentially as if no cookie had been returned. Alternatively, if supported by the client software, the cookie can be returned with an EXPIRE field set to the current time. This indicates to the client system that the cookie has expired and should be deleted. Thus, in a subsequent access by the client, no cookie will be returned.

Another possible terminating event occurs when the client requests a document which has previously been requested, even if all the documents in the group have not yet been requested. In such a case, the SMS can consider the present logical session terminated and open a new session by returning the file path of the most recent version of the document and indicating the most recent version in the GVN portion of the VALUE field. The rational behind this terminating event is the concept that if an already accessed document is being requested again, then the client does not appear to have a need for unrequested documents of the old version and hence it is reasonable to start a new logical session. It should be noted that if this end condition is implemented, setting all document bits in a BV to "1", i.e., after all documents have been accessed, will automatically initiate a new session on a subsequent access by the client.

A further mechanism through which a logical session can be terminated is by the elapsing of a defined time-out period in the Registration Table. If a client establishes a logical session but does not access a document in the group within the time out period, the logical session expires and the next access to the group will be considered a new logical session. A time-out ("TO") period can be defined globally, on a group basis, or separately for each version of a group. Various time-out periods 50 are defined in the Registration Tables illustrated in FIGS. 2–4.

When a client makes a request for a document which has an associated time out period, the cookie returned by the SMS has its EXPIRES field set to be the present time plus the time out period. If the client makes subsequent requests for documents in this version, then the EXPIRES field in the cookie will be appropriately updated with each request. However, if the time between two requests to the group exceeds the time-out period, the expiration time for the cookie will elapse and the client Internet software will automatically discard the cookie. A subsequent request by the client to the group of documents will not be accompanied by a cookie and thus, a new logical session will be started and the latest version of the requested document will be returned.

This use of the Time-Out period also serves as a guide to determine when the SMS can remove an old version of a group, i.e., perform garbage collection. According to one method, the SMS maintains a table of expiration times for each group version defined in the Registration Table. Each time the SMS receives a request for a document in version v of group G, the SMS updates the expiration time for that version to equal the current time plus the time out period. The passing of the expiration time indicates that there should be no clients with a logical session that is open to the associated version. Thus, on a periodic basis, the SMS can delete from the registration table stored in internal memory those versions with expiration times that have elapsed without interfering with any open logical sessions. The SMS 12 can also forward such expiration time information to the GSUI 22 to permit a similar garbage collection in the master copy of the Registration Table if desired.

Figure 5:
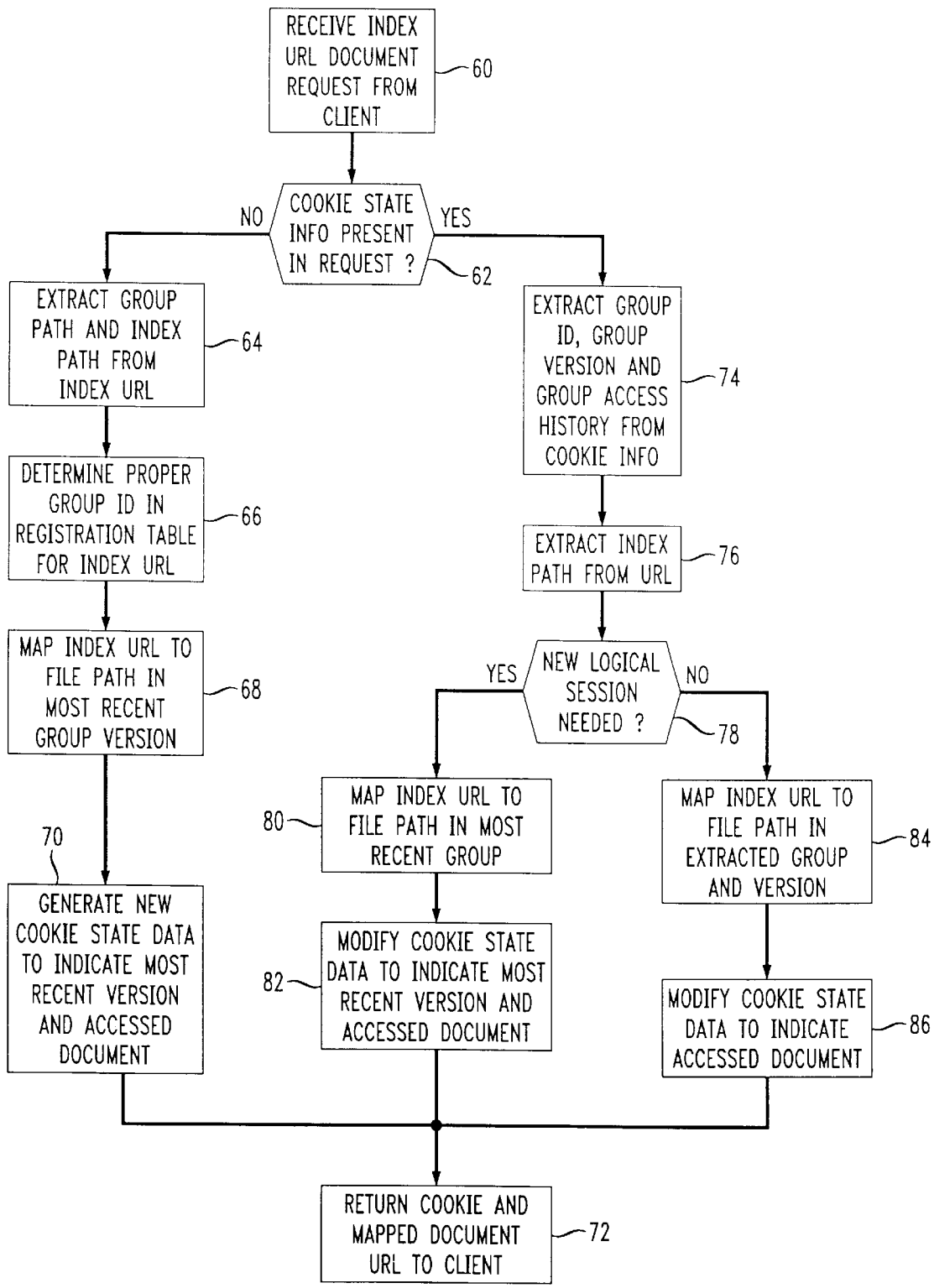
FIG. 5 is a flow chart illustrating one method for update and retrieval of documents according to the invention.

The method for consistent update and retrieval of documents in a WWW server performed by the SMS 12 will now be summarized with reference to the flow chart of FIG. 5. Initially, the SMS receives an index URL (referencing an index path from the Registration Table) from the client via HTTP server 16 and the CGI program 18 (step 60). The SMS examines the request and determines whether a cookie (containing state information) has been forwarded along with the client request (step 62).

If no cookie is present, a new logical session is started. The SMS extracts a Group path and index path from the URL (step 64) and cross-references the Group information to the Registration table to determine the Group ID of the group referenced by the index URL (step 66). After the group is identified, the index path is mapped to the corresponding file path in the most recent version of the identified group (step 68). A new cookie is then generated containing state data which associates the cookie with the determined group and indicates the most recent group version along with information indicating the particular document entry which has been accessed (step 70). Finally, the mapped document URL and new cookie are returned to the client via the CGI script 18 and HTTP Server 16 (step 72).

If a cookie is included with the client request, a logical session has previously been initiated. The Group ID and version for the session, as well as the group access history (e.g., in the form of a bit vector) are extracted from the cookie data (step 74) and the index path is extracted from the index URL (step 76). Based on the group access history, a determination is made as to whether a new logical session should be started (step 78). Various conditions for triggering a new logical session are discussed above.

If a new logical session is warranted, the SMS 12 proceeds in a manner similar to the case where no cookie is present. The index URL is mapped to the corresponding file path in the most recent version of the group (step 80) and the cookie information is modified to reflect the new version number and the accessed document (step 82). The modified cookie and mapped URL are then returned to the client (step 72).

If an existing logical session is continued, the SMS 12 maps the index URL to the corresponding file path in the group version indicated by the cookie data (step 84). The cookie information is modified to record the document access (step 86). Finally, the modified cookie and mapped document URL are returned to the client (step 72).

While the invention has been particularly shown and described with reference to preferred embodiments thereof, it will be understood by those skilled in the art that various changes in form and details may be made therein without departing from the spirit and scope of the invention.

We claim:

1. A method for providing coherent access to a group of documents over the Internet, each document having at least one changed segment and each document of the group of documents represents versions of a first document wherein segments have been changed over time, comprising the steps of:

receiving a request from a requester for a document from said group of versions of said document, said request including a document index path and a cookie associated with a domain of a state management server and said group, said cookie further containing state information, the state information having a value field with a first portion indicating a group version number and a second portion indicating a version of said group of documents previously accessed;

extracting said state information from said cookie;

mapping said document index path to a corresponding file path identifying a physical location of a particular version of said document in said group of versions in accordance with versions of the group of documents previously accessed as indicated in said state information; and returning said file path to the requester.

2. The method of claim 1, wherein said state information indicates a previously accessed version of said group, said mapping step comprising the step of mapping said document index path to a corresponding file path in said previously accessed version of said group.

3. The method of claim 1, wherein said state information indicates a previously accessed version of said group and includes file access data indicating previously accessed documents in said previously accessed version of said group, said method further comprising the steps of:

modifying said state information in said cookie to include updated file access data indicating an access to said requested document; and returning said modified cookie to the requestor.

4. The method of claim 3, wherein:

in response to a determination that said requested document does not correspond to a previously accessed document in said previously accessed version of said group, said mapping step comprises the step of mapping said document index path to a corresponding file path identifying a physical location of said requested document in said indicated previously accessed version of said group;

otherwise said mapping step comprises the step of mapping said document index path to a corresponding file path identifying a physical location of said requested document in a most recent version of said group, and said modifying step further comprises the step of modifying said state information to indicate said most recent version of said group.

5. The method of claim 3, wherein said modifying step further comprises the step of setting an expiration time of said cookie equal to a present time plus a predetermined time-out period.

6. A method for providing coherent access to a group of documents over the Internet, each document having at least one changed segment and each document of the group of documents represents versions of a first document wherein segments have been changed over time, comprising the steps of:

receiving a request from a requester for a document from said group of versions of said document, said request including a document index path and lacking a cookie associated with a domain of a state management server and said group mapping said document index path to a corresponding file path identifying a physical location of a particular version of said document in the most recent version of said group of versions;

generating a cookie associated with the domain of said state management server and said group and including state information having a value field with a first portion indicating a group version number and a second portion indicating a most recent version of said group previously accessed; and returning said file path and cookie to the requester.

7. A system for providing coherent access to a plurality of versions of a group of documents stored in a file system and retrievable over the Internet from an HTTP server, each document having at least one changed segment and each document of the group of documents represents versions of a first document wherein segments have been changed over time, said system comprising:

a state management server having an Internet domain and including a processor and a memory;

said memory including group registration data comprising:

a group path associated with said group;

an index path set associated with said group and having at least one index path, and a file path set associated with each said version of said group of documents, each respective file path set including a file path identifying the physical location in said file system of each document in said associated version of said group of documents and being associated with a particular index path in said index path set;

said processor, upon receipt of a request from said HTTP server that includes a requested document index path being configured to:

(a) determine if said request includes a cookie which is associated with said domain, associated with said group path, and contains state information, the state information having a value field with a first portion indicating a group version number and a second portion indicating a version of said group of documents previously accessed;

(b) in response to a positive determination that the request includes the cookie:

(c) map said document index path to a corresponding file path in the file path set associated with a particular version of said document in said group of versions in accordance with versions of the group of documents previously accessed as indicated in said state information; and (c) return said corresponding file path to said HTTP server.

8. The system of claim 7, wherein said state information indicates a previously accessed version of said group, said processor being configured to map said document index path to a corresponding file path in said previously accessed version of said group.

9. The system of claim 7, wherein said state information indicates a previously accessed version of said group and includes file access data indicating previously accessed documents in said previously accessed version of said group, said processor being further configured to:

modify said state information in said cookie to include updated file access data indicating an access to said requested document; and return said modified cookie to said HTTP server.

10. The system of claim 9, wherein said processor is further configured to:

determine if said requested document corresponds to a previously accessed document in said previously accessed version of said group;

in response to a negative determination, map said document index path to a corresponding file path in the file path set associated with said indicated previously accessed version of said group; and in response to a positive determination(a) map said document index path to a corresponding file path in the file path set associated with a most recent version of said group, and (b) modify said state information to indicate said most recent version of said group.

11. The system of claim 9, wherein said processor is further configured to set an expiration time of said cookie equal to a present time plus a predetermined time-out period.

12. The system of claim 7, wherein said processor is further configured to, in response to a negative determination that the request includes the cookie:

(a) generate a cookie associated with the domain of said state management server and said group and including state information indicating a most recent version of said group;

(b) map said document index path to a corresponding file path in the file path set associated with the most recent version of said group of documents; and (c) return said corresponding file path and cookie to said HTTP server.

* * * * *